No. 835,755. PATENTED NOV. 13, 1906.
F. HOLDEN.
ELECTRICAL MEASURING INSTRUMENT.
APPLICATION FILED JAN. 2, 1904.
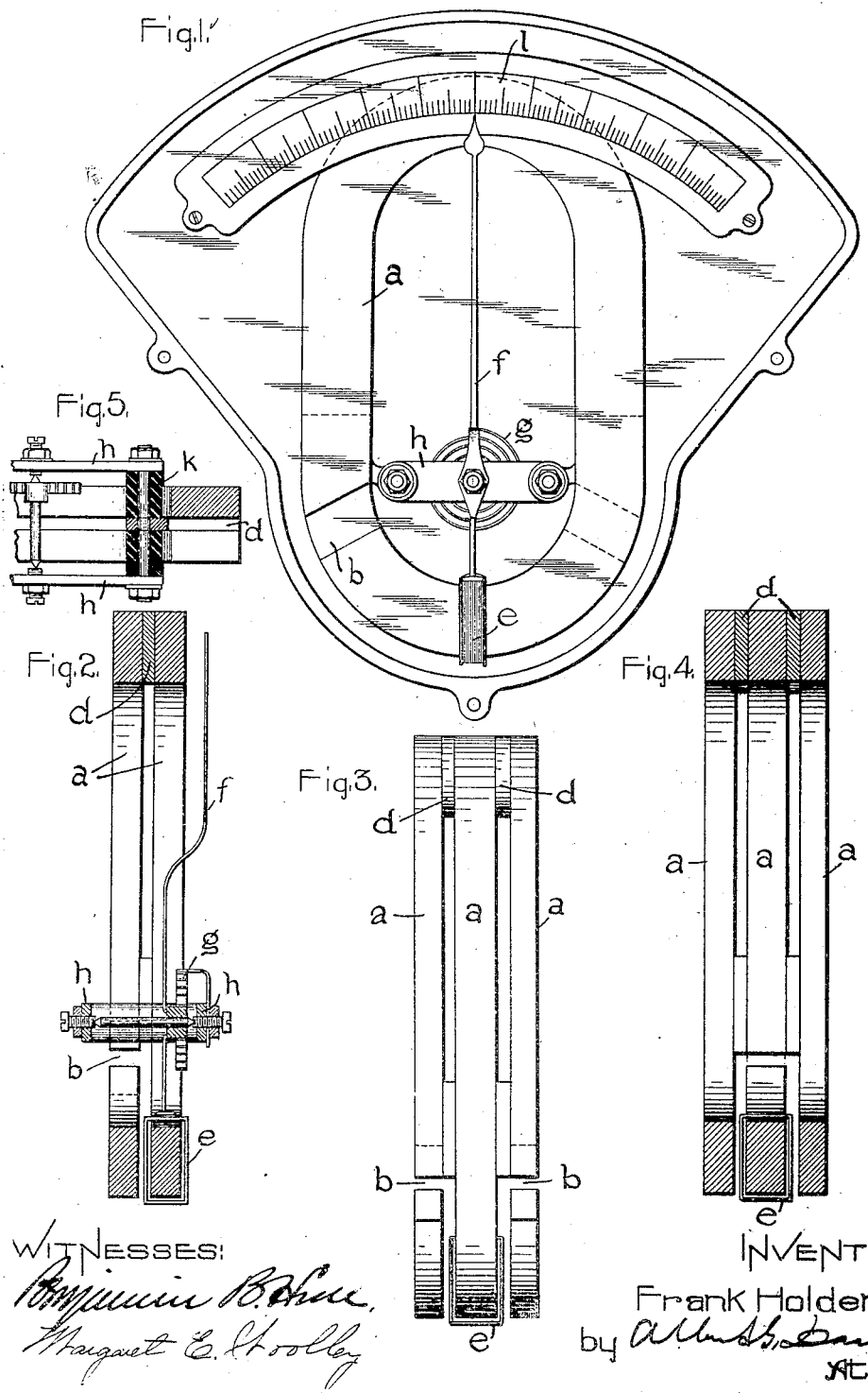
WITNESSES:
INVENTOR:
Frank Holden.
by Atty.

UNITED STATES PATENT OFFICE.

FRANK HOLDEN, OF RUGBY, ENGLAND, ASSIGNOR TO GENERAL ELECTRIC COMPANY, A CORPORATION OF NEW YORK.

ELECTRICAL MEASURING INSTRUMENT.

No. 835,755.  Specification of Letters Patent.  Patented Nov. 13, 1906.

Application filed January 2, 1904. Serial No. 187,456.

*To all whom it may concern:*

Be it known that I, FRANK HOLDEN, a citizen of the United States, residing at Rugby, in the county of Warwick, England, have invented certain new and useful Improvements in Electric Measuring Instruments, of which the following is a specification.

My invention relates to electric measuring instruments of the moving-coil type employed for the measurement of continuous currents, and has for its object to simplify and cheapen the construction of such instruments by obviating the necessity of attaching polar extensions to the magnets and at the same time to provide a form of instrument in which the moving coil is capable of movement through a large range.

The accompanying drawings serve to illustrate my invention.

Figure 1 is an elevation of an electric meter of the moving-coil type fitted with my improvements. Fig. 2 is a cross-sectional view of the magnetic system of the meter illustrated in Fig. 1. Figs. 3 and 4 are side elevation and section, respectively, of another modification of my invention. Fig. 5 is an enlarged detail view showing the method of mounting the indicating-pointer.

In carrying out my invention according to the modification illustrated in Figs. 1 and 2, I provide a pair of ring-magnets $a$ of flat rectangular section and conveniently of substantially oval form, the oval having straight sides with semicircular ends. The pole-pieces of each magnet are constructed by interrupting each ring across its axis at or about one of the junctions of a semicircular end with a corresponding straight portion, as shown at $b$, Fig. 1. The two rings are then superposed with the air-gaps occupying relatively opposite positions, so that semicircular pole-faces of opposite polarity confront each other. A suitable number of distance-pieces $d$, of iron or other suitable material, are fastened between the rings, so as to hold them securely in position relatively to each other. The distance between the confronting pole-faces is small relatively to the length of the gaps across the axis of the rings, so that an intense field shunted across the space between the said confronting pole-faces is produced, which is substantially uniform over the whole length of the pole-faces. This field forms the working field of the instruments and operates on the current in a light coil $e$, surrounding one of the pole-pieces, so as to produce movement of the coil in the direction along the axis of the said pole-piece. This coil is carried on the extremity of a balanced index-pointer $f$, which is pivoted on an axis fitted with the usual controlling-springs $g$, and indicates the movement of the coil $e$ on the graduated scale $l$. The axis of this pointer is pivoted between two cross-bars $h$, supported at each side by short columns $k$, of insulating material, which are carried by inwardly-projecting portions of the distance-pieces $d$, thus forming a very compact and inexpensive construction, as clearly shown in Fig. 5.

According to the modification of my invention illustrated in Figs. 3 and 4, I employ three superposed ring-magnets $a$ of the form above described. The air-gaps $b$ across the axes of the two outer magnets are similarly disposed with regard to each other, but oppositely disposed with regard to the intermediate ring, so that the semicircular polar extremity of the latter has two pole-faces of opposite polarity confronting it on opposite sides. The moving coil $e$ surrounds the curved pole-pieces of the intermediate magnet, so that it is subject to the field across the two gaps on opposite sides of the said pole-piece. In this case the intermediate magnet is preferably of larger section than the two outer magnets, as shown in Fig. 4, as it requires to carry a larger magnetic flux. This form of magnetic structure may be employed in the construction of an astatic instrument by providing two moving coils secured to the same pivoted pointer, these coils embracing the curved pole-pieces of the two outer magnets.

In instruments constructed in accordance with my invention I preferably soften the magnet-steel at polar extremities, so as to increase the permeability of the latter, and therefore obtain greater uniformity of field.

What I claim as new, and desire to secure by Letters Patent of the United States, is—

1. In an electric measuring instrument, two similar permanent magnets, each having a pole end bent lengthwise of the magnet in the arc of a circle, mounted in reverse relative positions with the curved pole ends in parallel planes confronting each other, and a moving coil within the air-gap between the curved pole ends.

2. In an electric measuring instrument, two similar permanent magnets, each having an internal pole end bent lengthwise of the magnet in the arc of a circle, mounted in reverse relative positions with the curved pole ends in parallel planes confronting each other, and a moving coil extending within the air-gap so formed pivoted on the axis about which the ends of the magnets are bent.

3. In an electric measuring instrument, two similar permanent magnets, each having a pole end bent lengthwise of the magnet in the arc of a circle, mounted in reverse relative positions with the curved pole ends in parallel planes confronting each other, and a measuring-coil encircling one of the curved pole ends and movable thereover.

4. In an electric measuring instrument, two similar permanent magnets, each having a pole end bent lengthwise of the magnet in the arc of a circle, mounted in reverse relative positions with the curved pole ends in parallel planes confronting each other, a shaft rotatable on the axis about which the ends of the magnets are bent, and a measuring-coil mounted on the shaft and encircling one of the pole ends and movable thereover.

5. In an electric measuring instrument, two similar permanent magnets, each having a pole end bent lengthwise of the magnet in an arc of a circle, and distance-pieces of magnetic material, said magnets being secured together in reverse relative positions with the distance-pieces between them so as to form a narrow air-gap of large area between the curved pole ends.

6. In an electric measuring instrument, two similar permanent magnets, each having a pole end bent lengthwise of the magnet in an arc of a circle, and distance-pieces of magnetic material, said magnets being secured together in reverse relative positions with the distance-pieces between them, a moving coil encircling one of the curved pole ends, and an indicator operatively connected to said coil.

7. In an electric measuring instrument, two similar permanent magnets having overlapping pole ends of opposite polarity arranged in parallel planes, and a coil moving within the air-gap between said pole ends, said field-magnets being made of hard steel and said pole ends of soft steel.

8. In an electric measuring instrument, two similar permanent magnets composed of hard steel each having a soft-steel pole end arranged in a plane parallel to and confronting a pole end of opposite polarity on the other magnet, and a coil moving within the air-gap between said pole ends.

9. In an electric measuring instrument, a permanent magnet having one of its pole ends composed of soft steel, a second permanent magnet of hard steel and having one of its pole ends composed of soft steel, said pole ends being arranged parallel to and confronting each other, and a coil moving within the air-gap between said pole ends.

10. A magnet of hard steel having pole ends of soft steel integral therewith.

11. A permanent magnet having a body portion of hard steel and softened pole ends integral therewith.

In witness whereof I have hereunto set my hand this 15th day of December, 1903.

FRANK HOLDEN

Witnesses:
R. WESTACOTT,
ALFRED NUTTING.